United States Patent [19]

DeJesus

[11] Patent Number: 5,061,052
[45] Date of Patent: Oct. 29, 1991

[54] TELEVISION PICTURE ENHANCEMENT DEVICE

[76] Inventor: Ben L. DeJesus, 402 E. 230th St., Carson, Calif. 90745

[21] Appl. No.: 560,063

[22] Filed: Jul. 27, 1990

[51] Int. Cl.$^5$ ............................................. G02B 3/08
[52] U.S. Cl. ................................. 359/742; 358/250; 359/619; 359/618
[58] Field of Search ............... 350/452, 422, 436, 174, 350/286, 480, 243, 167; 358/250

[56] References Cited

U.S. PATENT DOCUMENTS

| | | | |
|---|---|---|---|
| 1,081,211 | 12/1913 | Churchill | 362/268 |
| 2,449,886 | 3/1948 | Dougherty | 350/44 |
| 3,203,306 | 8/1965 | Lefferts | 350/452 |
| 4,671,625 | 6/1987 | Noble | 350/452 |
| 4,710,820 | 12/1987 | Roberts | 358/250 |

Primary Examiner—Bruce Y. Arnold
Assistant Examiner—Hung Xuan Dang
Attorney, Agent, or Firm—Charles H. Thomas

[57] ABSTRACT

An optical system is provided for magnifying the image on a television receiver to viewers in a room. The system is comprised of a plano-convex lens disposed in front of the viewing screen of a television set and a fresnel lens interposed between the viewing screen and the plano-convex lens. The fresnel lens has a smooth surface and an opposite surface configured with a pattern of concentric dioptric ridges facing the plano-convex lens. The magnification achieved by the combination of lenses allows viewers within the room to view a magnified image on the television receiver. Preferably, the planar surface of the plano-convex lens and the smooth surface of said fresnel lens are both disposed to face the television screen so that the television screen can be viewed without significant aberrations or distortion from a wide range of viewing distances.

30 Claims, 7 Drawing Sheets

TELEVISION PICTURE ENHANCEMENT DEVICE

BACKGROUND OF THE INVENTION

1. Field of the Invention

The present invention relates to an improvement for a television receiver which magnifies the images displayed on the receiver screen to persons viewing the television.

2. Description of the Prior Art

Various lens systems have been devised to attempt to magnify the images on a television receiver screen so that television viewers can watch the television screen from a distance without an excessive loss of detail in the image. The purpose of such systems is to allow persons to view televised programs or television sets having small screens without sitting extremely close to the television set or to enhance the details which they are able to see. One such magnification system is disclosed, for example, in U.S. Pat. No. 2,449,886. However, conventional television screen magnification systems have proven unsatisfactory for several reasons.

The lens systems which have been employed in conventional television receiver image magnification devices have caused excessive distortion and aberrations in the images which they magnify. The magnification achieved is not uniform, so that the image observed is significantly distorted and different parts of the image which are observed across the face of the magnification system differ greatly in proportion. As a consequence, conventional magnification systems have never achieved significant commercial success since the images observed have always been so distorted.

A further disadvantage of conventional television screen image magnification systems is the high directional sensitivity of such systems. Indeed, unless an observer is located almost directly in front of such a magnification system for a television receiver so as to observe the image along a line of sight substantially coincident with the axis of the kinescope tube of the receiver, portions of the image observed are highly distorted and indeed images at the corners of the magnification systems are often unrecognizable. If one attempts to view a television screen through a prior art plano-convex lens magnification system, the image can only be observed within forty five degrees from either side of the axis of the kinescope tube of the receiver. If a viewer is positioned more than forty five degrees from the center line of the kinescope axis, as measured from the intersection of that axis with the outermost surface of the magnification system, no image can be seen. The same is true when viewing a television screen through a prior art magnification system which employs only a Fresnel lens.

This disadvantage renders the devices unsatisfactory in many viewing situations, where the functional and aesthetic placement of furniture within a room prohibits seating along a line of sight coincident with the kinescope axis, and where a television receiver is viewed from several different locations within a room. As a result, while a person seated directly in front of the television receiver observing the image through a conventional magnification system along a line of sight substantially coincident with the kinescope axis will observe images which are magnified with only moderate distortion, other observers seated only slightly to the side of the kinescope axis will observe images which are highly distorted.

A further disadvantage of conventional television receiver magnification systems is that the magnified images are produced faithfully and without substantial distortion only when viewed from a particular distance from the receiver. When the television receiver is viewed from distances either closer to or further from the optimal distance for which conventional magnification systems are designed, substantial distortion and significant aberrations appear.

Prior art television receiver magnification systems, such as that described in U.S. Pat. No. 2,449,886 do not produce a uniform magnification of an image. The portions of the image at the center of the television screen are disproportionately magnified relative to the portions of the image at the periphery of the screen. Thus, for example, if an image of a human being is displayed full length upon the television screen, the head and feet of the individual viewed through a conventional magnification system will appear disproportionately small and the waist and midriff section of the individual will appear excessively large. Similarly, if an automobile image is displayed at full length on a television screen the passenger compartment will appear excessively large, while the front and rear fenders and bumpers will appear disproportionately small. Such distortions are characteristic of an image viewed through a plano-convex lens or a Fresnel lens alone.

A further disadvantageous feature of plano-convex lenses as employed for magnifying images from a television screen is that such lenses magnify not only the televised image of interest, but also the raster of horizontal broadcast scanning lines. These horizontal scanning lines are so narrow and closely spaced together in a conventional television screen as to be unobjectional when the image on the receiver screen is viewed at normal size. However, when the image is magnified by only a plano-convex lens, both the width and the separation between the broadcast scanning lines is magnified.

SUMMARY OF THE INVENTION

The present invention achieves significant improvements over the deficiencies of prior art television screen magnification systems. The present invention allows individuals of limited means to enjoy the entertainment and education provided by large screen television images without the necessity for purchasing a large, space consuming and expensive television set. To the contrary, by utilizing the lens combination of the present invention the small images produced by compact, inexpensive television sets can be magnified without significant distortion or aberration to allow a viewer to see a much larger image than the image displayed on the television screen.

In one broad aspect the present invention may be considered to be an improvement in a television set having a viewing screen. The improvement of the invention is comprised of a plano-convex lens in combination with a Fresnel lens. The plano-convex lens has a planar surface and a convex surface and is disposed in front of the viewing screen. The Fresnel lens has a smooth surface and an opposite surface configured with a pattern of concentric dioptric ridges thereon and is interposed between the viewing screen and the plano-convex lens.

Although magnification systems have previously been devised utilizing a plano-convex lens alone, and although television viewing magnification systems have been devised utilizing a Fresnel lens alone, a combination of a plano-convex lens in front of a television viewing screen with a Fresnel lens interposed therebetween has not heretofore been utilized.

The term television set or receiver, as employed herein, refers to any receiver in a telecommunication system for transmission of transient images of fixed or moving objects. Thus, this term is meant to encompass cathode ray tubes and kinescopes of the type employed in computer monitors, radar display scopes, televised medical imaging devices, computer enhanced displays and other comparable receivers employed in television transmission.

In the preferred embodiment of the invention the plano-convex lens is disposed such that the planar surface thereof faces the viewing screen of the television set and the Fresnel lens is disposed so that its smooth surface faces the viewing screen and its opposite surface faces the plano-convex lens. Using the preferred embodiments of the lens system of the invention, television receivers can be observed from different vantage points in front of a television set with a faithful reproduction of the image on the television screen in magnified form. The television receiver magnification system of the invention allows a number of individuals within a room to comfortably view a television receiver through the magnification system of the invention from different vantage points relative to the television receiver kinescope axis.

A further advantage of the preferred embodiments of the television receiver magnification system of the invention is that it can be readily adapted for observation from widely varying distances. The system provides accurate magnification without objectional distortion to observers seated at different distances from the television screen. Moreover, with minor adjustment of the positions of the lenses relative to each other and to the viewing screen, the magnification system can be adjusted for optimum observation from a wide variety of vantage points at a selected distance.

By employing a plano-convex lens in combination with a Fresnel lens according to the present invention, distortions and aberrations characteristic of prior art magnification systems are corrected. The Fresnel lens serves to concentrate the projected image uniformly across its surface. The lens combination thereby neutralizes or compensates for the distortions and aberrations which are otherwise produced using only a plano-convex lens alone or only a Fresnel lens alone. By interposing a Fresnel lens between a plano-convex lens and a television receiver, the magnification effects of the plano-convex lens upon television broadcast scanning lines in a television are neutralized while still providing a clearly televised image.

The Fresnel lens preferably has a thickness of between about one-eighth and one-quarter of an inch, depending on the sizes of the lenses in the lens combination. The Fresnel lens may be formed of glass or plastic and is preferably located between about one-quarter inch and eight and one-half inches from the viewing screen. Location of the Fresnel lens within this distance results in practically no distortion or aberration of the image viewed regardless of the distance of the viewer from the television viewing screen.

The greater the distance of the Fresnel lens from the viewing screen the greater will be the extent of magnification. If the Fresnel lens is located more distant from the viewing screen than about eight and one half inches, distortion will be produced. The positioning of the Fresnel lens about four and one-half inches from the viewing screen in a system in which the thickness of the plano-convex lens at its center is about three and one-half inches produces very satisfactory magnification without distortion and aberration as viewed from widely separated locations within a room.

The Fresnel lens may be a flat, planar lens oriented perpendicular to the axis of the television kinescope. Preferably, however, the Fresnel lens is curved to conform to the curvature of the television receiver screen. Curvature in this fashion enhances the uniformity of magnification achieved with the system.

The planar surface of the plano-convex lens is preferably located between about zero and one and three-quarters inches from the surface of the Fresnel lens upon which the concentric annular prismatic zones are defined. The plano-convex lens preferably has a thickness of between about one-half inch and six inches or more at its center depending on manufacturing feasibility, with a focal length of between about two inches and about four inches. With a maximum lens thickness at its center of about three and one-half inches, the convex surface of the plano-convex lens is preferably curved at a radius of curvature of about twelve and one-half inches.

Both the plano-convex lens and the Fresnel lens are preferably formed with mutually parallel top and bottom edges and mutually parallel side edges so as to exhibit a generally rectangular profile when viewed along the axis of alignment of the lenses. The lenses will normally be aligned on a horizontal axis of alignment coinciding with the axis of the television kinescope.

The Fresnel lens is preferably curved about a vertical axis that intersects the horizontal axis of alignment such that the side edges of the Fresnel lens are spaced from the planar surface of the plano-convex lens a greater distance than are the centers of the top and bottom edges of the Fresnel lens. The Fresnel lens is thereby shaped as an arcuate segment of a vertically aligned cylinder.

While the preferred embodiments of the invention involve an orientation of the lenses such that the planer surface of the plano-convex lens and the smooth surface of the Fresnel lens both face the television viewing screen, other embodiments of the invention may also be employed for particular purposed. For example, there are many different instances in government, science, medicine, business and industry in which it is desireable for the image of a small television screen to be magnified. Such applications for magnifying a television broadcast picture or for closed circuit television exist in many different commercial, medical, recreational, video, scientific and military situations.

In many situations of this type a television set is intended to be viewed by a single individual sitting directly in front of the screen and at a predictable distance therefrom. Radar screens are observed by air traffic controllers in this manner. Likewise, computer operators are similarly positioned directly in front of the television screens of computer monitors. Security personnel likewise view television screens from fixed vantage points. Medical observers likewise often view television screens from directly in front of a kinescope viewing screen while sitting very close to the screen.

For applications in which a television screen is to be observed by an individual at close range sitting directly in front of the screen, it is not necessary for the planar surface of the plano-convex lens and the smooth surface of the Fresnel lens to be disposed so as to face the viewing screen. Indeed, either or both of the lenses may be reversed in orientation and provide distortion and aberration free magnified images when viewed at close range by an individual observing the screen from a vantage point close to the kinescope axis.

In special purpose applications the plano-convex lens may be disposed so that the convex surface thereof faces the viewing screen while the smooth surface of the Fresnel lens also faces the viewing screen. Alternatively, systems may involve the orientation of the lenses such that the convex surface of the plano-convex lens faces the viewing screen while the surface of the Fresnel lens having the pattern of dioptric ridges thereon is disposed to face the television viewing screen.

In still another alternative arrangement the planar surface of the plano-convex lens is disposed to face the viewing screen while the surface of the Fresnel lens configured with a pattern of dioptric ridges thereon is disposed to face the viewing screen. All of these various lens arrangements of the combination of a plano-convex lens with a Fresnel lens disposed to view a display screen are contemplated within the scope of the invention.

In another aspect the invention may be considered to be an improvement for a television set having a viewing screen. The improvement of the invention is comprised of the combination of a plano-convex lens and a Fresnel lens. The plano-convex lens has a first convex surface and an opposite second planar surface. The Fresnel lens has a first surface with a pattern of dioptric concentric annular ridges thereon and a second smooth surface. The Fresnel lens is disposed between the viewing screen and the plano-convex lens.

Preferably, the first surface of the Fresnel lens having the dioptric concentric annular ridges thereon faces the second planar surface of the plano convex lens and the planar surface of the plano-convex lens is disposed to face towards the viewing screen of the television set. The second smooth surface of the Fresnel lens thereby faces the viewing screen.

In still another aspect the invention may be considered to be an apparatus for enlarging an image from a television screen. The apparatus of the invention is comprised of a combination of a plano-convex lens and a Fresnel lens in front of a television set. The plano-convex lens has a planar surface and an opposite convex surface. The Fresnel lens is interposed between the plano-convex lens and the television screen and has a smooth surface and an opposite surface having concentric annular prismatic zones thereon. The apparatus is preferably comprised of a framework that holds the plano-convex lens and the Fresnel lens in fixed disposition relative to each other.

The invention may be described with greater clarity and particularity with reference to the accompanying drawings.

DESCRIPTION OF THE EMBODIMENTS

Figure 1:
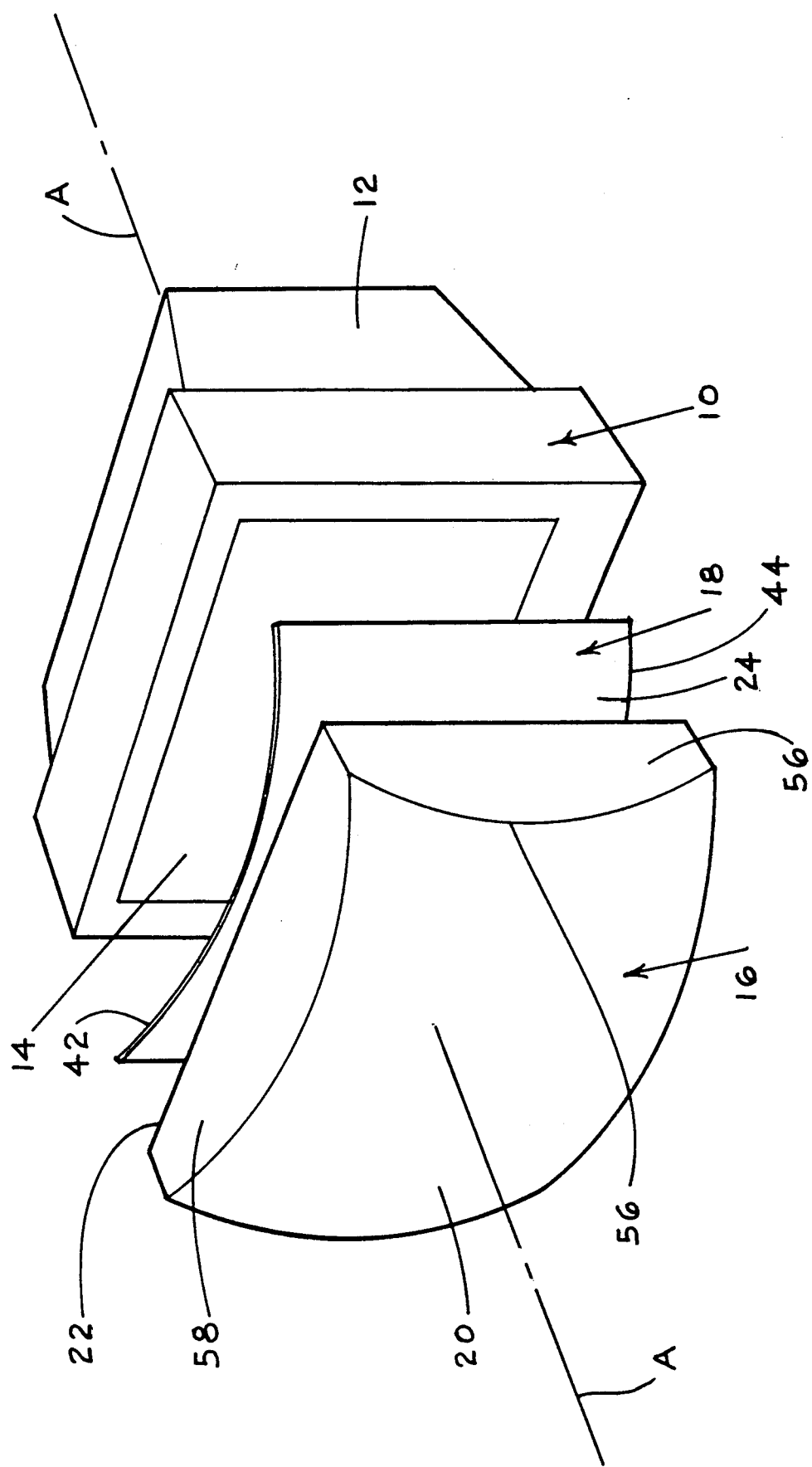
FIG. 1 is an exploded perspective view of a preferred embodiment of the operative elements of the invention, viewed from the front.

FIG. 1 depicts a conventional prior art television receiver 10 of the type found in most households in this country. The television receiver 10 has a cabinet 12 which houses the electronic components required to produce a televised image on the television receiver viewing screen 14 that occupies the greater portion of the space at the front of the cabinet 12. The television receiver viewing screen 14 is a luminescent screen at the target end of a cathode ray tube in which the electrical signals received from a television antenna or cable are translated into a televised picture. The picture is visible on the receiver screen 14. The television 10 may be either of the type that produces a black and white image, or a color television set.

The operative lens elements of the invention are a plano-convex lens 16 and a Fresnel lens 18. The plano-convex lens 16 has a first convex surface 20 and an opposite second planar surface 22. The planar surface 22 is disposed to face toward the viewing screen 14. The Fresnel lens 18 has a first surface 24 with a pattern of dioptric concentric annular ridges thereon and a second smooth surface 26. The first surface 24 of the Fresnel lens 18 faces the second planar surface 22 of the plano-convex lens while the second smooth surface 26 of the Fresnel lens 18 faces the viewing screen 14 of the television set 10.

The smooth surface 26 of the Fresnel lens 18 is preferably located between about one-quarter inch and about eight and one half inches from the viewing screen 14, depending on the size of the plano-convex and Fresnel lenses in the combination. The minimum distance from the second planar surface 22 of the convex lens to the first patterned surface 24 of the Fresnel lens 18 is preferably no greater than about one and three quarters inches.

Figure 2:
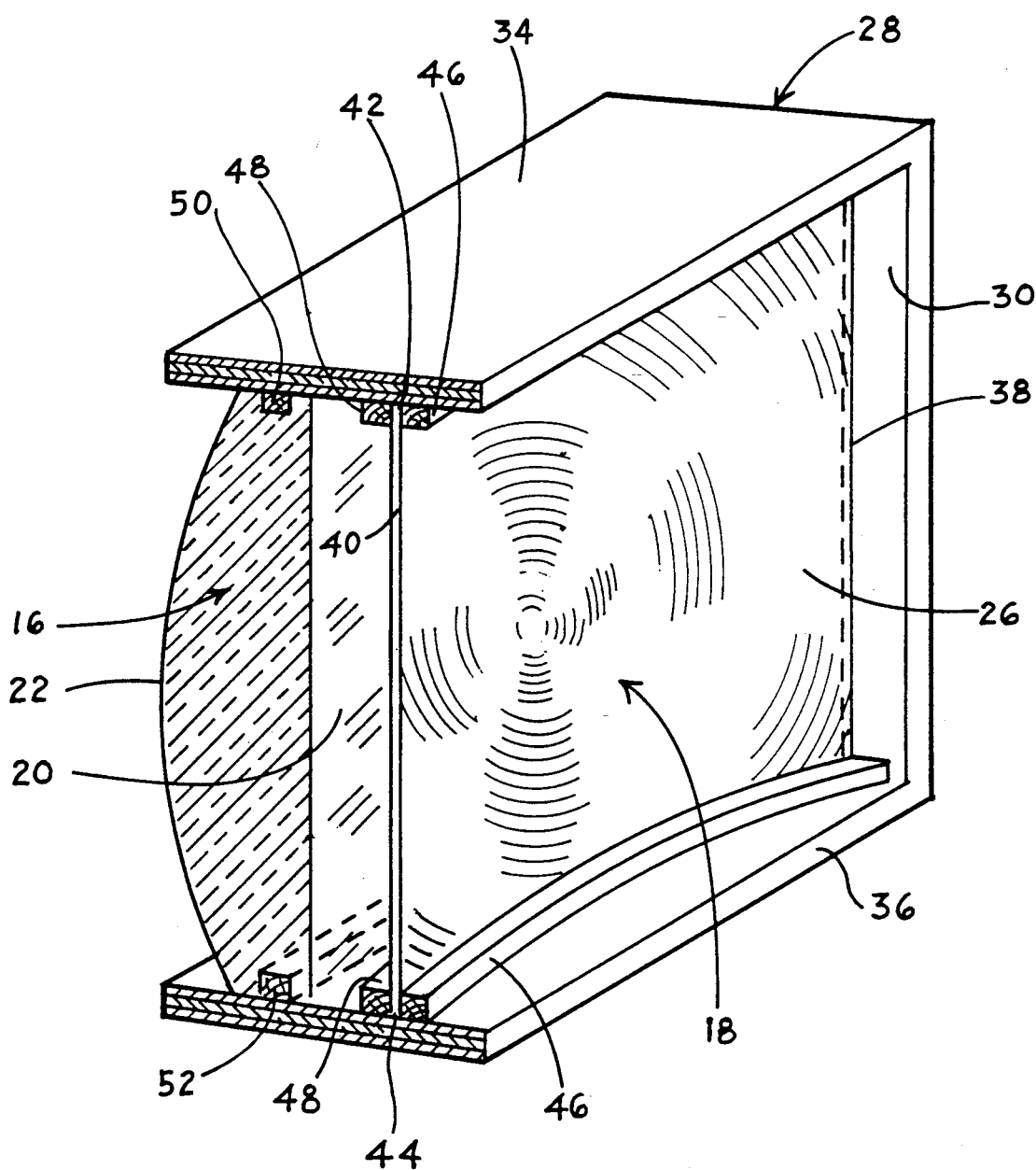
FIG. 2 is a perspective view from the rear of a preferred embodiment of an assembled apparatus according to the invention, with one side of the framework removed for clarity of illustration of the internal components.
Figure 3:
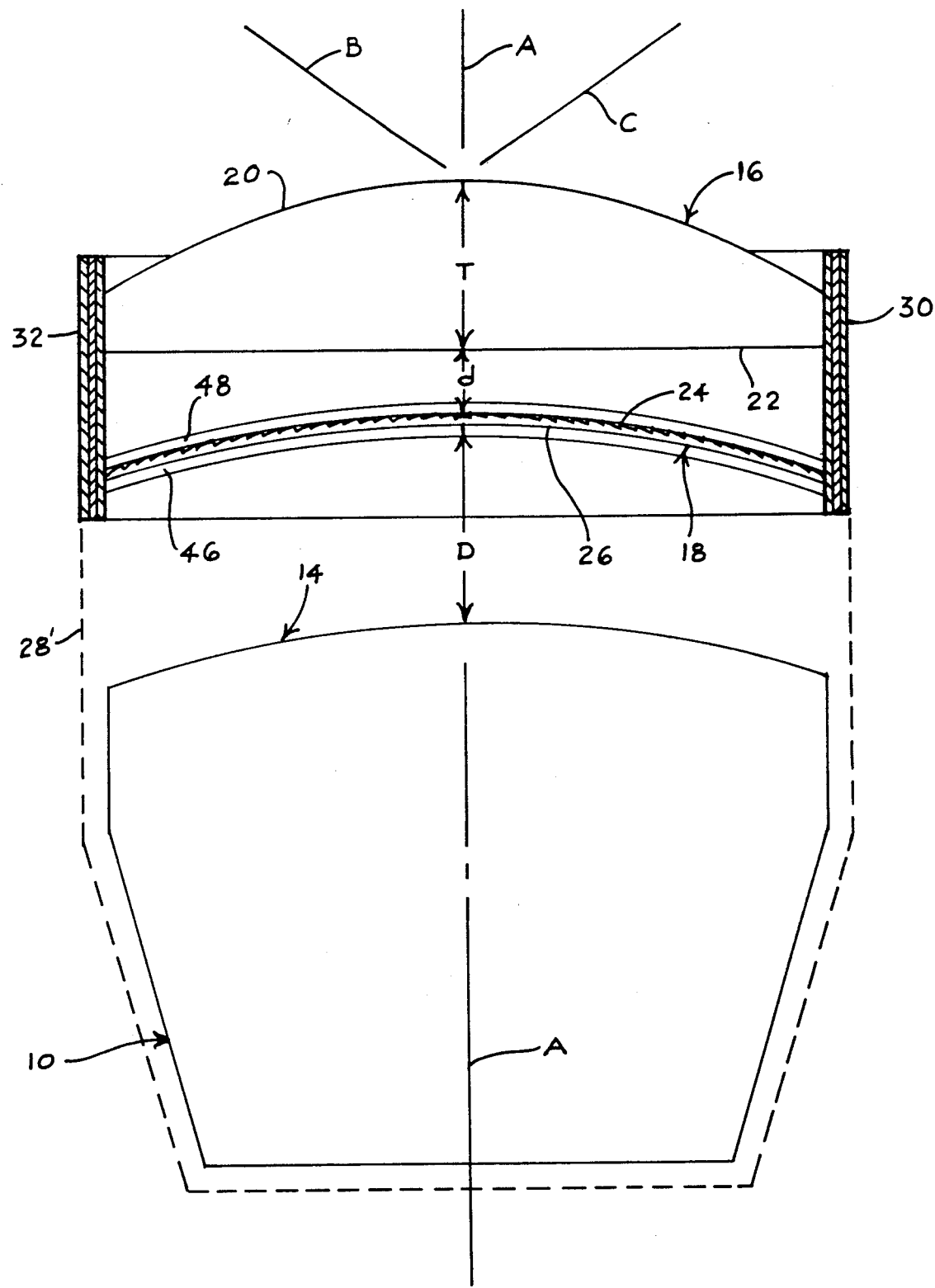
FIG. 3 is a top plan view of the apparatus of FIG. 2 with the top of the framework removed for clarity of illustration of the internal components.

To hold the lenses 16 and 18 in proper alignment relative to each other and relative to the viewing screen 14, the combination of lenses is preferably mounted in a framework indicated generally at 28 in FIGS. 2 and 3. The framework 28 may be formed of a top panel 34, a bottom panel 36, and left and right side panels 30 and 32, respectively, as viewed from in front of the television screen 14. The side panels 30 and 32, the top panel 34 and the bottom panel 36 of the framework 28 are preferably all formed of rectangular sections of plywood one-half or three-quarters inches in thickness. The framework side panels 30 and 32 are oriented in mutually parallel vertical alignment while the top panel 34 and the bottom panel 36 are disposed in mutually parallel horizontal alignment. The panels 30-36 are fastened together at their intersecting edges by conventional means, such as glue, nails or screws. When the panels 30-36 are assembled together, the outer configuration of the framework 28 is in the shape of a rectangular prism, open at both the front and back.

In the embodiment of FIGS. 1-5, the Fresnel lens 18 may be between about one-eighth of an inch thick and one-quarter of an inch in thickness and is preferably constructed of a plastic which exhibits some resiliency. The Fresnel lens 18 has upright mutually parallel lateral edges 38 and 40 and transverse mutually parallel top and bottom edges 42 and 44, respectively. Pairs of redwood guide strips 46 and 48, each one of which is approximately one-quarter inch square in cross section, are secured to the top and bottom frame panels 34 and 36 on the interiorally facing surfaces thereof. The guide strips 46 and 48 in each pair are thin enough to be arcuately flexed and permanently secured to the panels 34 and 36 in curved, uniformly spaced, mutually parallel disposition relative to each other. The curvature of the guide strips 46 and 48 preferably matches the curvature of the television receiver screen 14 in a horizontal plane, as best depicted in FIG. 3.

The pairs of guide strips 46 and 48 define slots therebetween adapted to receive the upper and lower edges 42 and 44 of the Fresnel lens 18 to thereby hold the Fresnel lens 18 in a disposition such that the second smooth surface 26 thereof is curved about a vertical axis parallel to the second planar surface 20 of the plano-convex lens 16. The lateral edges 38 and 40 of the Fresnel lens 18 are thereby held equidistant and further from the second planar surface 20 of the plano-convex lens 16 than are the top and bottom edges 42 and 44 therebetween.

The framework 28 is also provided with a pair of straight transverse guide strips 50 and 52 for holding the plano-convex lens 16. The guide strips 50 and 52 are also formed of redwood having a cross section of one-quarter by one-quarter inches. The guide strips 50 and 52 are secured in a horizontal disposition and are fastened to the interior surfaces of the top and bottom panels 34 and 36 in front of the guide strips 46 and 48, as illustrated in FIG. 2. The guide strips 50 and 52 fit into channels 54 which are defined into the structure of the plano-convex lens 16 laterally across the top and bottom edges 58 and 60 thereof.

The guide strips 50 and 52 are spaced forwardly from the guide strips 46 and 48 within the framework 28 such that the minimum distance d, indicated in FIG. 3, from the second planar surface 22 of the plano-convex lens 16 to the first dioptrically patterned surface 24 of the Fresnel lens 18 is no greater than about one and three-quarters inches. With the placement and securement of the guide strips 46, 48, 50 and 52 on the framework panels 34 and 36, the framework 28 is adapted to hold both the plano-convex lens 16 and the Fresnel lens 18 in fixed disposition relative to each other.

The plano-convex lens 16 is preferably formed of plastic with a focal length of between two inches and four inches. The maximum thickness of the plano-convex lens 16, which is at the center of the lens and is indicated by the distance T in FIG. 3 is preferably three and one-half inches. A spacing of the smooth Fresnel lens surface 26 from the viewing screen 14 of about four and one-half inches is the preferred spacing for a plano-convex lens 16 of this size. The radius of curvature of the convex surface 20 is preferably twelve and one-half inches for a lens of thickness T equal to three and one-half inches.

The sides 56 and the top and bottom surfaces 58 and 60 of the plano-convex lens 16 are preferably cut or formed as planar surfaces. The planar sides 56 are parallel to each other and reside in vertical planes parallel to the horizontal, longitudinal axis of alignment A of the lenses 16 and 18 and the television set 10. The top surface 58 and the bottom surface 60 of the plano-convex lens 16 are also mutually parallel to each other and reside in horizontal planes which are likewise parallel to the axis of alignment A of the lenses 16 and 18 and the television set 10. The planar surface 22 of the plano-convex lens 16 thereby has a rectangular shape. Parallel transverse linear channels 54 of uniform cross section throughout are defined into the top and bottom surfaces 58 and 60.

The Fresnel lens 18 is preferably formed of a transparent plastic, such as lucite, and is preferably only about one-eighth of an inch in thickness so that it can be resiliently deformed into the shape of a curved plane, as best illustrated in FIGS. 1 and 2. The second smooth surface 26 of the Fresnel lens 18 thereby assumes the shape of an arcuate segment of a vertically oriented cylinder. The forwardly facing surface 24 of the Fresnel lens 18 is configured with concentric, prismatic zones of spherical curvature. These zones are designed with sufficient curvature to converge the light emanating from a source behind the Fresnel lens 18, namely the television receiver screen 14. The light from the television screen 14 is converged upon the planar surface 22 of the plano-convex lens 16.

Figure 6:
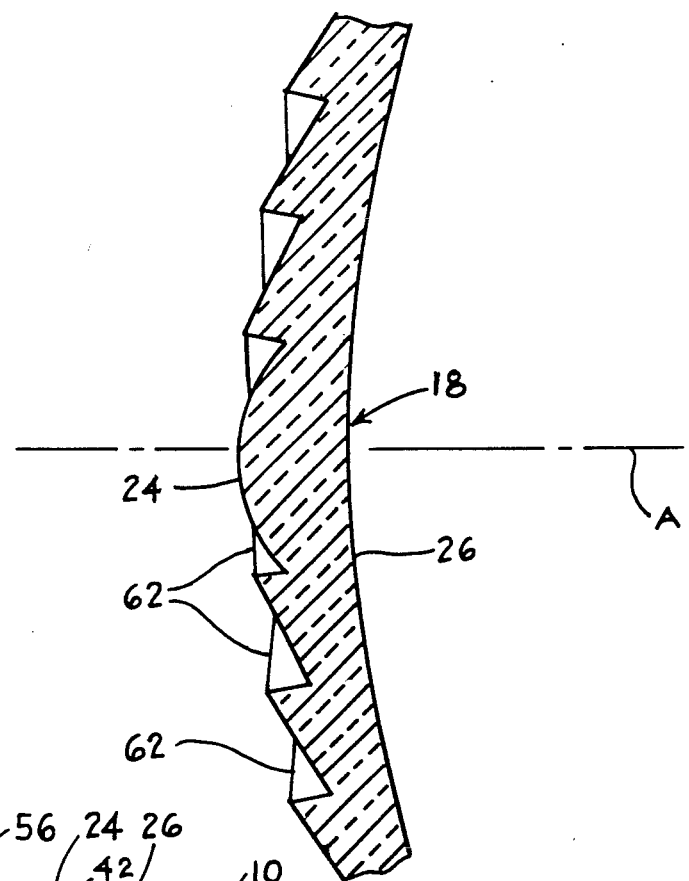
FIG. 6 is a plan sectional view of the Fresnel lens employed in the invention.
Figure 4:
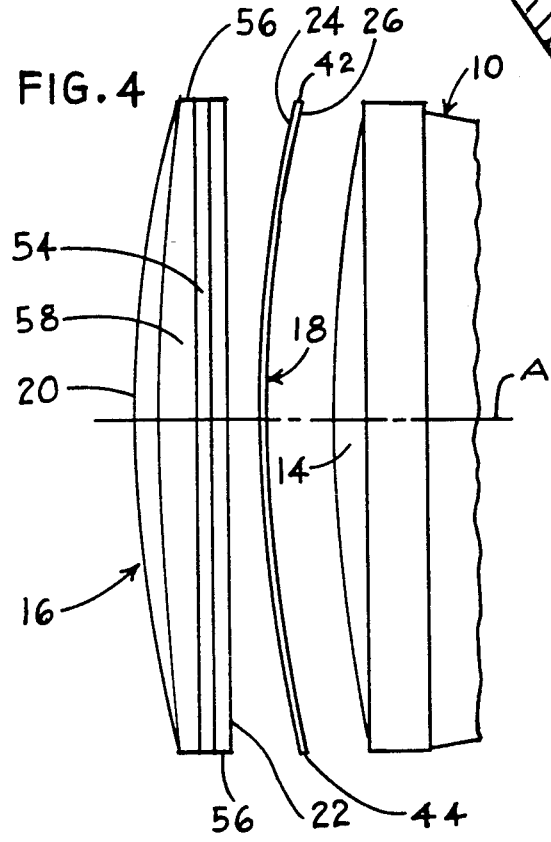
FIG. 4 is a top plan view showing the alignment of the operative elements of the embodiment of FIGS. and 3.
Figure 5:
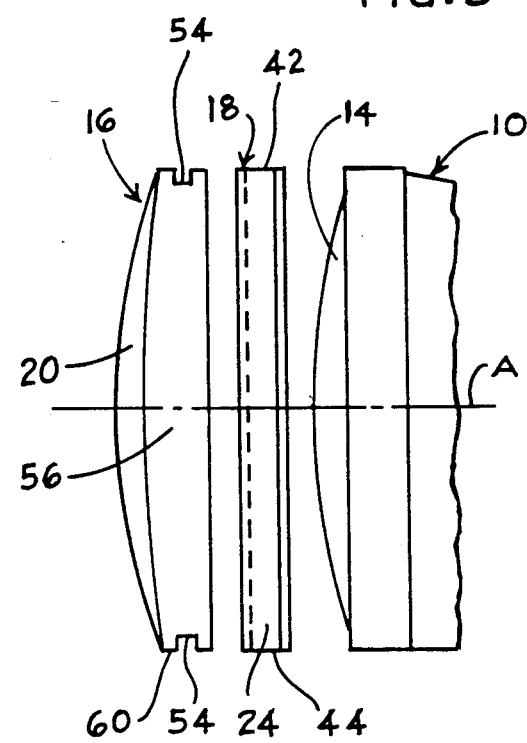
FIG. 5 is a side elevational view showing the alignment of the operative elements of the embodiment of FIGS. 2 and 3.

The concentric pattern of ridges 62 on the surface 24 of the Fresnel lens 18 comprise a step-type spherical lenticular lens, as illustrated in FIG. 6. The size of the ridges 62 and the curvature of the Fresnel lens 18 in FIG. 6 has been exaggerated for purposes of illustration. In the actual preferred embodiment the ridges 62 are quite small and spaced closely one to another. As illustrated in FIG. 6, the angle of the concentric annular ridges 62 relative to the axis of alignment A varies with distance of the ridges from the axis A. The angle of each ridge increases progressively from the center of the Fresnel lens 18 toward the periphery thereof. One type of construction suitable for fabrication of the Fresnel lens 18 is described in U.S. Pat. No. 3,203,306.

The lenses 16 and 18 may be secured in fixed relation relative to each other by first assembling the top and bottom framework panels 34 and 36 together with the side panel 30, as illustrated in FIG. 2. The Fresnel lens 18 is then flexed and inserted laterally into the slots defined between the guides strips 46 and 48. The plastic structure of the Fresnel lens 18 is sufficiently resilient to allow the planar sheet of plastic from which the Fresnel lens 18 is formed to bend and follow the curvature of the curved guides strips 46 and 48.

The plano-convex lens 16 is then also inserted laterally between the upper and lower panels 34 and 36 with the transverse linear channels 54 receiving the linear straight guide strips 50 and 52 therein. The rectangular side panel 32 is then installed in position and is connected to the ends of the upper and lower panels 34 and 36, so that the framework 28 holds the Fresnel lens 18 and plano-convex lens 16 in fixed disposition relative to each other, as illustrated in FIG. 3.

The assembled framework 28, with the lenses 16 and 18 therein, may then be manipulated as a portable unit and positioned in front of the television set 10 with the second smooth surface 26 of the Fresnel lens 18 residing at a distance D from the television receiver screen 14, as desired by the user. The distance D may be varied to adjust the degree of magnification achieved. Preferably, the distance D between the second smooth surface 24 of the Fresnel lens 18 and the viewing screen 14 is between about one-quarter inch and about eight and one-half inches.

If desired, the framework holding the lenses 16 and 18 may be extended as indicated at 28' in FIG. 3 to house the entire television set 10. The extended framework 28' is thereby adapted to encase the television set 10, as well as to hold the lenses 16 and 18 in proper alignment along the axis A. In this alternative arrangement the distance D will remain constant, so that the spacing of the lenses 16 and 18 from the television receiver 14 will not be inadvertently altered.

When the framework 28 is positioned in front of a small television set 10 having a television screen 14 only five inches in size, the picture viewed by the observers in front of the front surface 20 of the plano-convex lens 16 appears at approximately the same size as the picture viewed on a nine to thirteen inch television set, depending upon the distance D. Likewise, when the lenses 16 and 18 are deployed as depicted in FIGS. 1-5 in front of a television set 10 having a screen 14 that is thirteen inches in size, the magnified image viewed by observers will be comparable to that produced by larger, more expensive television sets which are nineteen to twenty one inches in size. Similarly, when a television set having a screen 14 that is nineteen inches in size is viewed through the lens combination depicted and described in FIGS. 1-5, the apparent televised image is comparable to that displayed by a television set having a screen thirty to thirty six inches in size.

Observers sitting in front of the television set 14 can sit in positions laterally offset from the kinescope axis A by as much as fifty five degrees and still see magnified but undistorted images. These limits of observation are indicated diagrammatically in FIG. 3 by the sector lines B and C. In contrast, in prior art systems employing only a plano-convex lens or only a Fresnel lens viewers can be situated no further from the kinescope axis A than forty five degrees. Even at that limit the magnified image is distorted, and beyond that limit no image at all can be seen.

Figure 7:
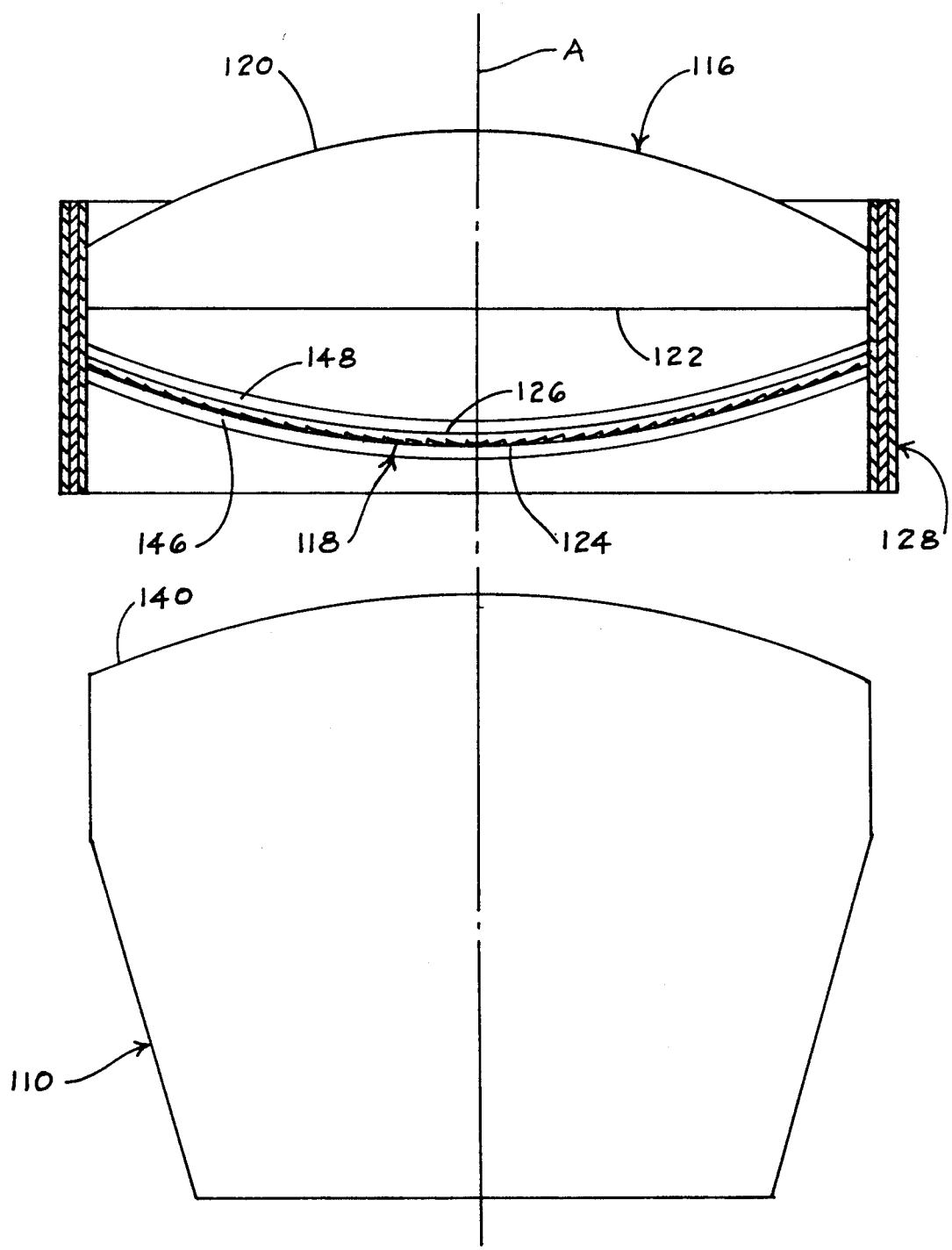
FIG. 7 is a top plan view showing the alignment of the operative elements of one alternative embodiment of the invention.

FIG. 7 illustrates one alternative embodiment of the invention which is suitable for use by an observer located directly in front of the screen 140 of a television set 110. In the embodiment of FIG. 7 a framework 128 is employed to hold a plano-convex lens 116 in fixed disposition relative to a Fresnel lens 118 in front of the television viewing screen 140. As in the embodiment of FIGS. 1-5, the plano-convex lens 116 is oriented such that its planar surface 122 faces the television screen 140, while its opposite convex surface 120 is directed outwardly away from the television screen 14. However, in the embodiment of FIG. 7 the guide strips 146 and 148 are arcuately curved in a direction convex toward the television screen 140. The Fresnel lens 118 has a smooth surface 126 and an opposite surface 124 configured with a pattern of dioptric ridges thereon of the type previously described. The Fresnel lens 118 is interposed between the viewing screen 140 and the plano-convex lens 116. However, it is the surface 124 configured with the pattern of dioptric annular ridges that faces the viewing screen 140, rather than the opposite smooth surface 126.

The embodiment of FIG. 7 will produce a magnified image of the television screen 140 to an observer seated proximate to the viewing screen 140 and proximate to the kinescope axis A. The embodiment of FIG. 7 may be advantageously employed in special purpose television viewing systems where an image on the viewing screen 140 is to be observed by a single individual located proximate to the television set 110.

Figure 8:
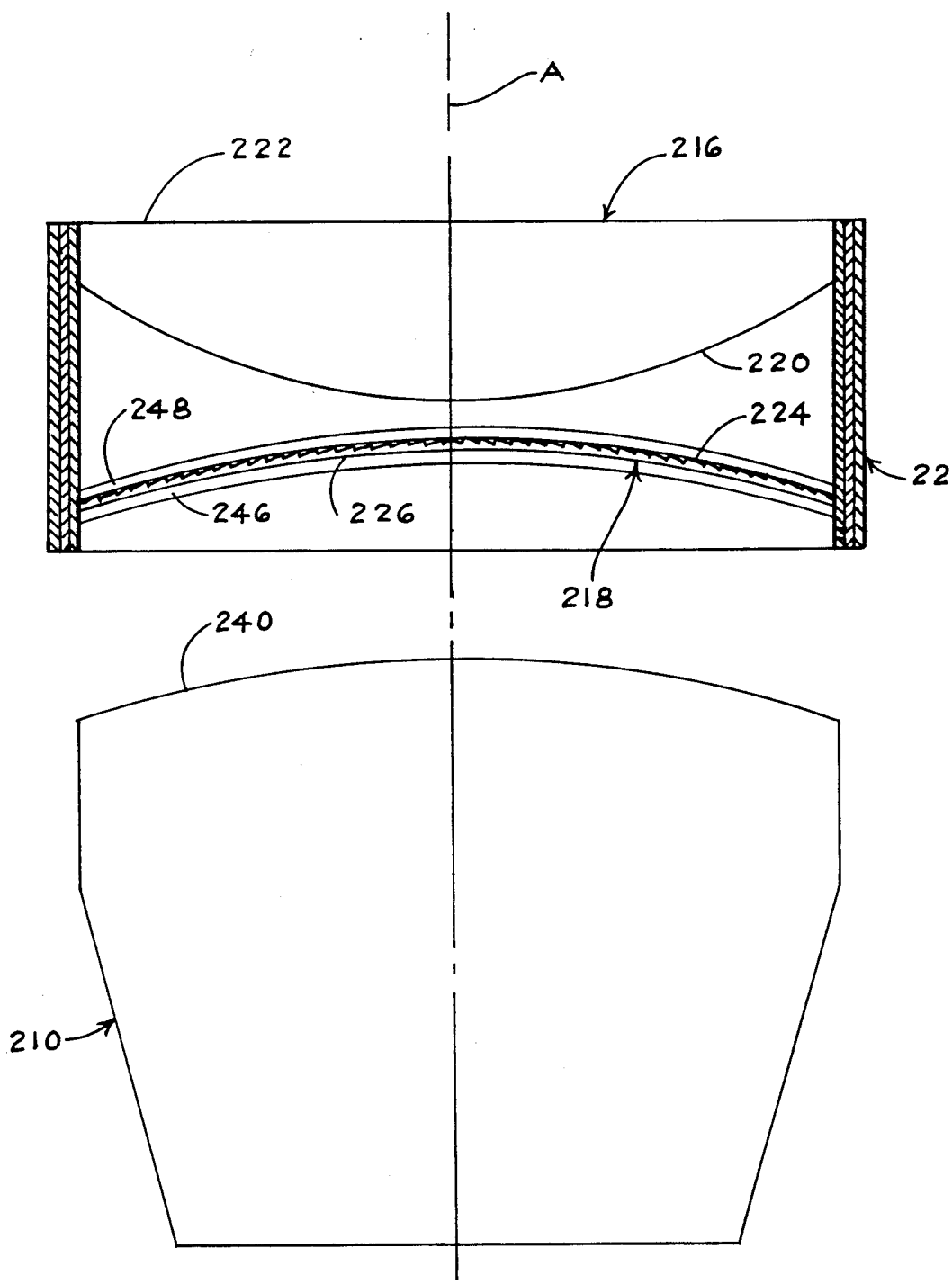
FIG. 8 is a top plan view showing the alignment of the operative elements of another alternative embodiment of the invention.

FIG. 8 illustrates another alternative embodiment of the invention in which a framework 228, similar to the framework 28, holds the combination of a plano-convex lens 216 and a Fresnel lens 218 in alignment on front of the viewing screen 240 of the television set 210. In the embodiment of FIG. 8 the convex surface 220 of the plano-convex lens 216 is disposed to face the viewing screen 240 of the television set 210, while the flat planar surface 222 thereof is directed outwardly and away from the viewing screen 240.

The Fresnel lens 218 is oriented in substantially the same manner as the Fresnel lens 18 in the embodiments of FIGS. 1-5. That is, the guide strips 246 and 248 of the framework 228 hold the Fresnel lens 218 such that its smooth surface 226 faces the viewing screen 240 and its opposite surface 224 that is configured with a pattern of dioptric annular ridges thereon faces outwardly away from the viewing screen 240 and toward the convex surface 220 of the plano-convex lens 216. The embodiment of FIG. 8 likewise has utility for use by persons seated in close proximity to the television set 210 and near the kinescope axis A.

Figure 9:
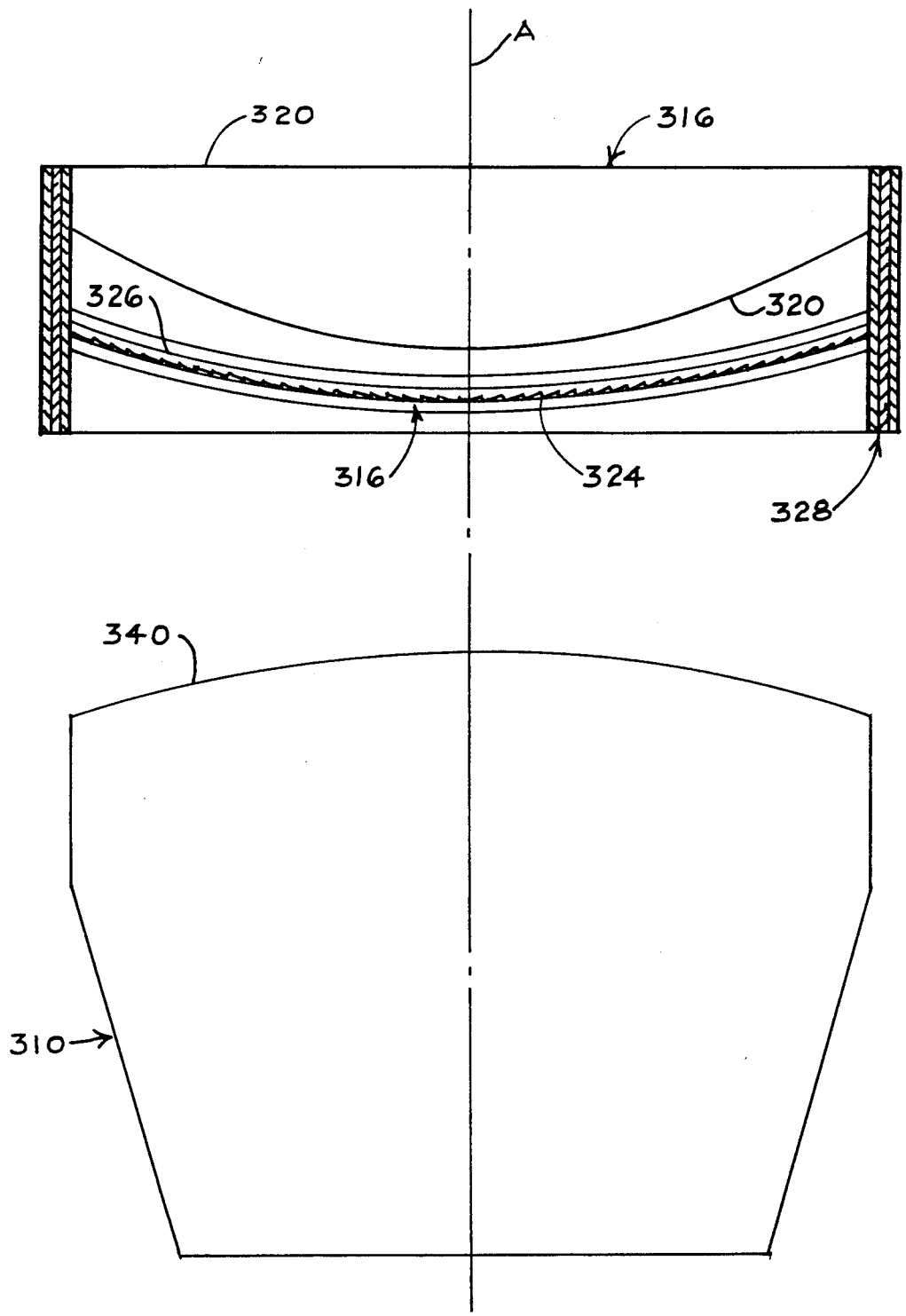
FIG. 9 is a top plan view showing the alignment of the operative elements of still another alternative embodiment of the invention.

FIG. 9 illustrates still another embodiment of the invention. The framework 328 of the embodiment of FIG. 9 is constructed in substantially the same manner as the framework 28 in the embodiment of FIGS. 1-5. The convex lens 316 of the embodiment of FIG. 9 is oriented substantially in the same manner as the convex lens of the embodiment of FIG. 8. That is, the convex lens 316 is disposed in front of a television viewing screen 340 of a television set 310 with its convex surface 320 facing the viewing screen 340. The opposite planar surface 320 faces outwardly away from the viewing screen 340.

In the embodiment of FIG. 9, the surface 324 of the Fresnel lens 316 which has the concentric annular prismatic zones or pattern of dioptric annular ridges thereon faces the television viewing screen 340. The opposite smooth surface 326 is directed toward the convex surface 320 of the plano-convex lens 316, and away from the television viewing screen 340. The embodiment of FIG. 9, like the embodiments of FIGS. 7 and 8, is designed for use by a person seated substantially in alignment with the kinescope axis A and in close proximity to the television set 310.

Undoubtedly, numerous other variations and modifications of the invention will become readily apparent to those familiar with optical image enhancement systems. Accordingly, the scope of the invention should not be construed as limited to the specific embodiments depicted and described herein, but rather is defined in the claims appended hereto.

I claim

1. In a television set having a viewing screen the improvement comprising a plano-convex lens having a planar surface and a convex surface disposed in front of said viewing screen, and a Fresnel lens having a smooth surface and an opposite surface configured with a pattern of dioptric ridges thereon interposed between said viewing screen and said plano-convex lens.

2. An improved television set according to claim 1 further characterized in that said planar surface of said plano-convex lens is disposed to face said viewing screen and said smooth surface of said Fresnel lens is disposed to face said viewing screen.

3. An improved television set according to claim 2 further characterized in that said smooth surface of said Fresnel lens is located between about one-quarter inch and about eight and one-half inches from said viewing screen.

4. An improved television set according to claim 3 further characterized in that said smooth surface of said Fresnel lens is located about four and one-half inches from said viewing screen and said plano-convex lens has a thickness of about three and one-half inches.

5. An improved television set according to claim 4 wherein said Fresnel lens has a thickness of about one-eighth of an inch.

6. An improved television set according to claim 4 wherein said Fresnel lens has a thickness of between about one-eighth and about one-quarter of an inch.

7. An improved television set according to claim 3 wherein said planar surface of said plano-convex lens is located between about zero and one three quarters inches from said opposite surface of said Fresnel lens.

8. An improved television set according to claim 7 wherein said Fresnel lens is formed with mutually parallel top and bottom edges and mutually parallel side edges extending between said top and bottom edges and is curved such that said side edges are spaced from said planar surface of said plano-convex lens a greater distance than the centers of said top and bottom edges thereof.

9. An improved television set according to claim 3 wherein said plano-convex lens has a maximum thickness of between about one-half inch and about six inches and said convex surface of said plano-convex lens is curved at a radius of curvature of about twelve and one-half inches.

10. An improved television set according to claim 9 further characterized in that said plano-convex lens has a focal length of between about two inches and about four inches.

11. An improved television set according to claim 1 further characterized in that said convex surface of said plano convex lens is disposed to face said viewing screen and said smooth surface of said Fresnel lens is disposed to face said viewing screen.

12. An improved television set according to claim 1 further characterized in that said convex surface of said plano-convex lens is disposed to face said viewing screen and said opposite surface of said Fresnel lens configured with said pattern of dioptric ridges thereon is disposed to face said viewing screen.

13. An improved television set according to claim 1 further characterized in that said planar surface of said plano-convex lens is disposed to face said viewing screen and said opposite surface of said Fresnel lens having said pattern of dioptric ridges thereon is disposed to face said viewing screen.

14. An improvement for a television set having a viewing screen comprising:
a plano-convex lens having a first convex surface and an opposite second planar surface disposed in front of said viewing screen and a Fresnel lens having a first surface with a pattern of dioptric, concentric annular ridges thereon and a second smooth surface is disposed between said viewing screen and said plano-convex lens.

15. An improvement according to claim 14 wherein said first surface of said Fresnel lens faces said second planar surface of said plano-convex lens and said second surface of said Fresnel lens faces said viewing screen.

16. An improvement according to claim 15 wherein the minimum distance from said second planar surface of said plano-convex lens to said first surface of said Fresnel lens is no greater than about one and three quarters inches.

17. An improvement according to claim 15 wherein said Fresnel lens has upright parallel lateral edges and transverse top and bottom edges extending therebetween and said first surface of said Fresnel lens is curved about an axis parallel to said second planar surface of said plano-convex lens such that said lateral edges of said Fresnel lens are equidistant and further from said second planar surface of said plano-convex lens than are said top and bottom edges therebetween.

18. An improved television set according to claim 15 further characterized in that said plano-convex lens has a focal length of between about two inches and four inches.

19. An improvement according to claim 14 further characterized in that said second smooth surface of said Fresnel lens is located between about one-quarter inch and about eight and one-half inches from said viewing screen.

20. An improvement according to claim 19 further characterzed in that said second smooth surface of said Fresnel lens is located about four and one-half inches from said viewing screen and said plano-convex lens has a thickness of about three and one-half inches.

21. An improvement according to claim 20 wherein said Fresnel lens has a thickness of about one-eighth of an inch.

22. An improvement according to claim 20 wherein said plano-convex lens has a maximum thickness of about three and one-half inches and said first convex surface of said plano-convex lens is curved at a radius of curvature of about twelve and one-half inches.

23. Apparatus for enlarging an image from a television screen comprising in combination a plano-convex lens having a planar surface and an opposite convex surface disposed in front of said television screen, and a Fresnel lens interposed between said plano-convex lens and said television screen and having a smooth surface and an opposite surface having concentric annular prismatic zones thereon.

24. Apparatus according to claim 23 wherein said planar surface of said plano-convex lens faces said television set and said smooth surface of said Fresnel lens faces said television screen.

25. Apparatus according to claim 24 further comprising a framework holding such plano-convex lens and said Fresnel lens in fixed disposition relative to each other.

26. Apparatus according to claim 25 wherein said framework is adapted to encase said television set.

27. Apparatus according to claim 24 further comprising means for holding said Fresnel lens such that said smooth surface thereof resides at a distance from said television screen of between about one-quarter of an inch and about eight and one-half inches.

28. Apparatus according to claim 23 wherein said convex surface of said plano-convex lens faces said television screen and said smooth surface of said Fresnel lens faces said television screen.

29. Apparatus according to claim 23 wherein said planar surface of said plano-convex lens faces said television screen and said surface of said Fresnel lens having concentric annular prismatic zones thereon faces said television screen.

30. Apparatus according to claim 23 wherein said convex surface of said plano-convex lens faces said television screen and said surface of said Fresnel lens having concentric annular prismatic zones thereon faces said television screen.

* * * * *